United States Patent [19]
Bhandari

[11] Patent Number: 5,833,025
[45] Date of Patent: Nov. 10, 1998

[54] WIRELESS AUTOMOBILE CRUISE CONTROL SYSTEM

[76] Inventor: Gurubaksh Bhandari, 3430 Henninger Rd.—Up, Cleveland, Ohio 44109

[21] Appl. No.: 527,403

[22] Filed: Sep. 13, 1995

[51] Int. Cl.$^6$ ................................................ B60Q 1/00
[52] U.S. Cl. ................................ 180/178; 180/179
[58] Field of Search ................................ 180/167, 168, 180/170, 178, 179, 171, 174, 175, 176; 307/10.1; 340/54, 531

[56] References Cited

U.S. PATENT DOCUMENTS

| | | | |
|---|---|---|---|
| 3,604,005 | 9/1971 | Gilmore | 343/225 |
| 4,456,903 | 6/1984 | Kishi et al. | 340/54 |
| 4,616,224 | 10/1986 | Reighard | 340/825.69 |
| 4,628,310 | 12/1986 | Reighard et al. | 340/825.72 |
| 4,737,656 | 4/1988 | Gottlieb | 307/10 R |
| 4,785,194 | 11/1988 | Gottlieb | 307/10 R |
| 5,054,569 | 10/1991 | Scott et al. | 180/167 |

Primary Examiner—Richard M. Camby
Attorney, Agent, or Firm—Oldham & Oldham CO., LPA

[57] ABSTRACT

The present invention is directed to a wireless cruise control apparatus and control system therefore, comprising a transmitter, a receiver and interface circuitry. The transmitter may be a small battery powered device which releasably attaches to a steering wheel or other portion of an automobile providing the driver with an easily accessible control panel for the automobile's cruise control. By depressing the appropriate command button the transmitter then broadcasts through air, such as by radio frequency transmission, the desired action to be taken which is then received by the receiver. Upon reception the radio frequency transmission is decoded in order to interpret the driver's desired command which is then implemented through the driver circuitry which supplies the appropriate control signals to the cruise control system. The apparatus is programmable for various cruise control systems so as to be usable with any type of speed control system, and includes safety measures to prevent unintended operation of the system.

17 Claims, 6 Drawing Sheets

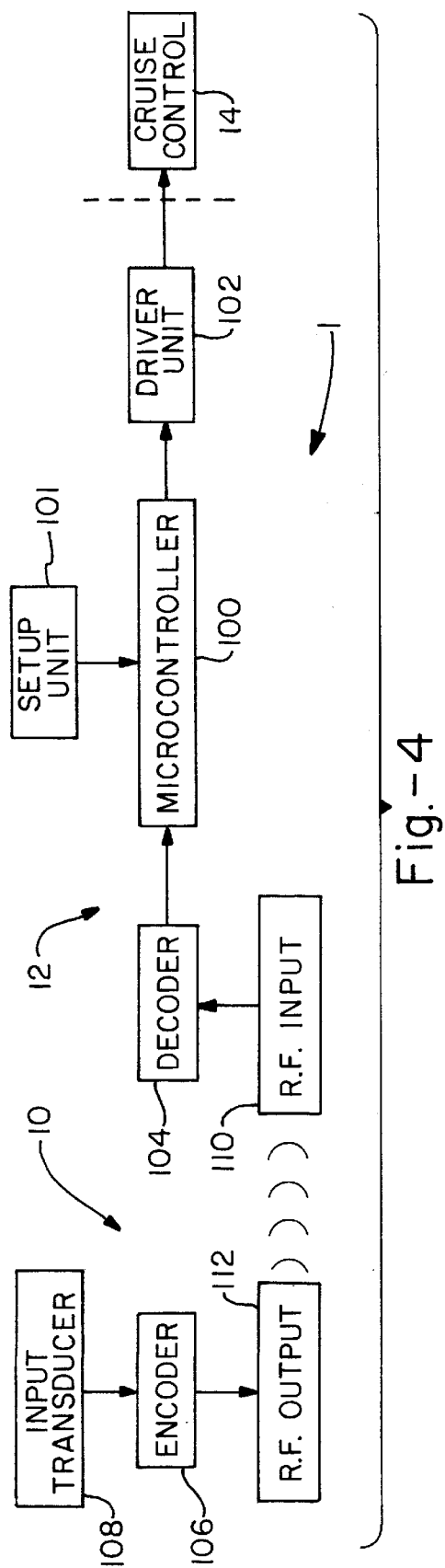
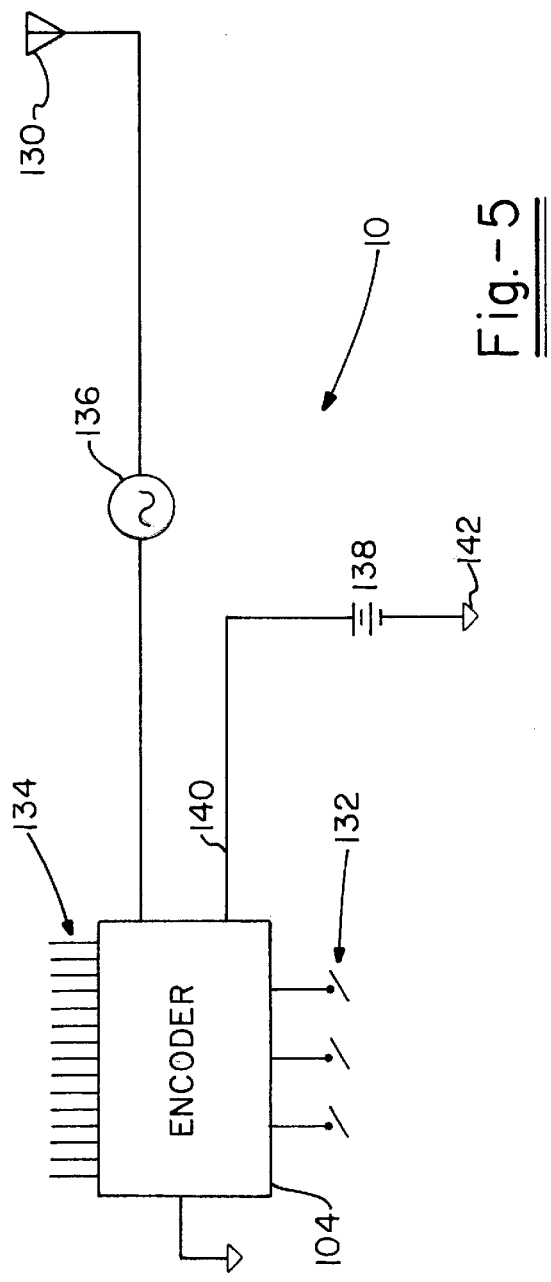

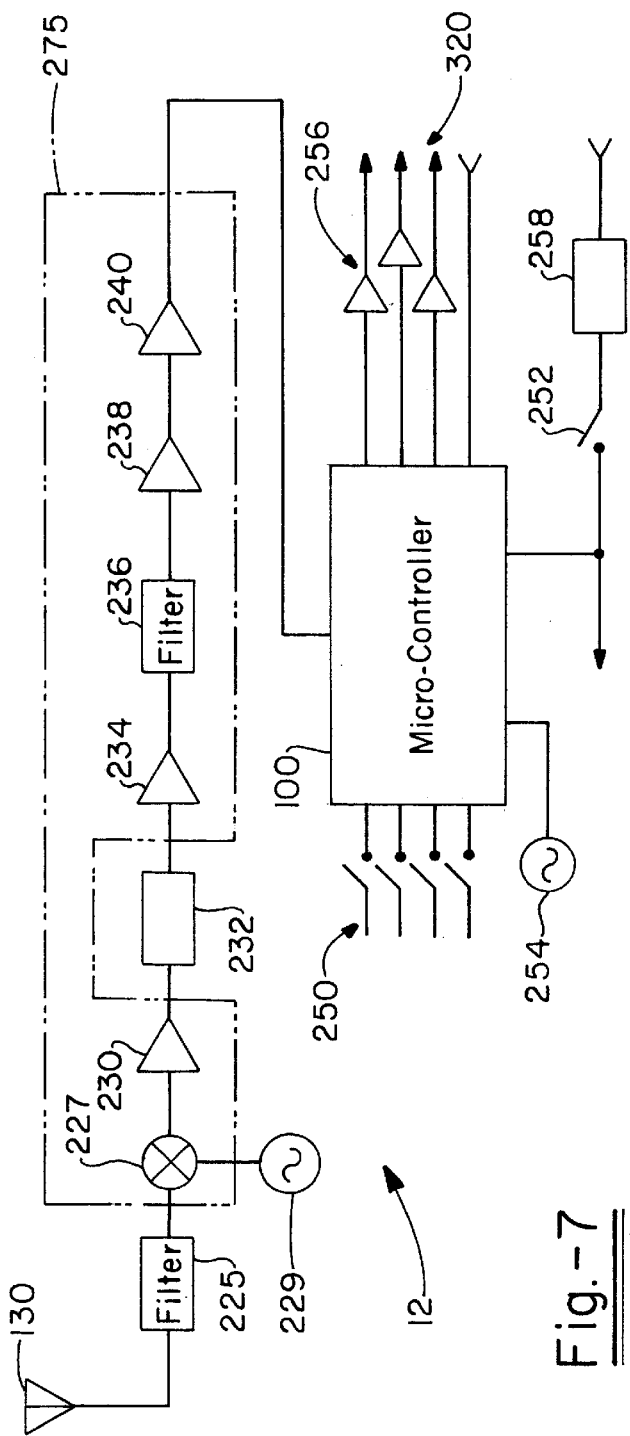
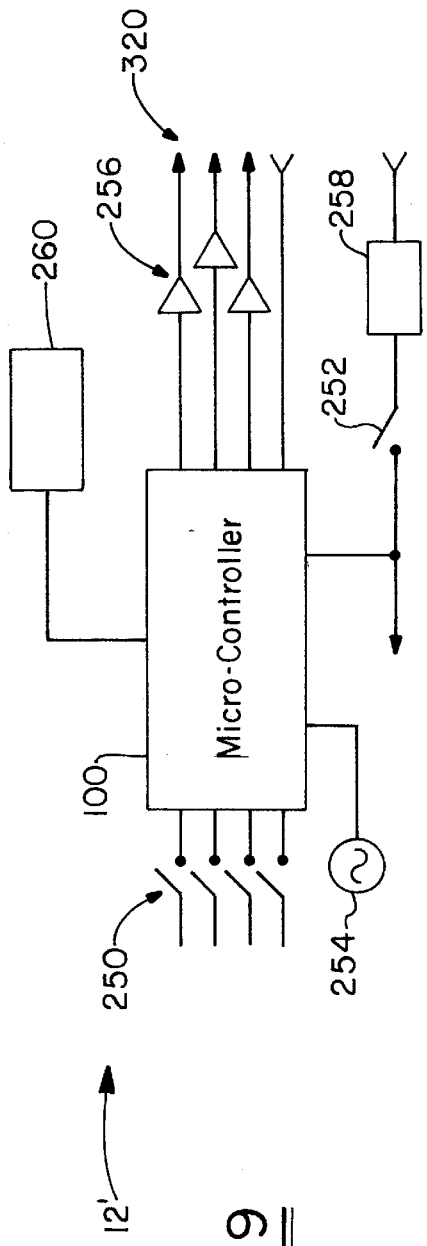
Fig.-7
Fig.-9

5,833,025

WIRELESS AUTOMOBILE CRUISE CONTROL SYSTEM

FIELD OF INVENTION

The present invention relates generally to an automobile cruise control system, and more particularly to a wireless control system to control the cruise control mechanisms of an automobile or similar vehicle.

BACKGROUND OF THE INVENTION

In order to add an automatic speed control system (commonly referred to as "cruise control") to an automobile or to replace the electrical control system on a vehicle already equipped with cruise control, it has heretofore been necessary to add a control stalk to the steering column of the vehicle including the wires connected to the control stalk which conventionally travel down through the steering column and connect to a control circuit. The control circuit may control a servo-mechanism that is in turn linked to the vehicle throttle such that the speed of the vehicle can be controlled by the vehicle driver through manipulation of the control stalk. Typically, using the control stalk, a driver can turn the cruise control system on/off, set the speed at which the vehicle is to travel, accelerate the vehicle, or decelerate the vehicle, all without utilizing the accelerator pedal of the vehicle.

The process of adding a new control stalk or replacing an existing control stalk with a new control stalk is relatively complicated by the need to install such a system, and in recent years, the process has become increasingly time consuming and consequently more expensive. The largest contributing factor to this added complexity has been the increasing use of airbags, especially those located in the center of the steering wheel to protect the vehicle driver in the event of a collision. The wires and circuitry to provide for the safe and effective operation of the airbag also are generally fed through and/or located in the steering column. This has made it difficult for "aftermarket" (as opposed to original equipment) cruise control providers to add the cruise control components to the vehicle. The airbag components may occupy all of the available space in the steering column, and more frequently, vehicle manufacturers will void the airbag warranty if either the steering column and/or steering wheel is disturbed by one other than a factory approved technician.

The above and other problems have led to an increase in labor cost, and a decrease in demand associated with aftermarket cruise control systems, and also in a decrease in the demand for new control circuitry to control an existing cruise control system of a vehicle.

SUMMARY OF THE INVENTION

The present invention is therefore directed to a wireless cruise control apparatus and control system therefore, comprising a transmitter, a receiver and interface circuitry. The transmitter may be a small battery powered device which releasably attaches to a steering wheel or other portion of an automobile providing the driver with an easily accessible control panel for the automobile's cruise control. By depressing the appropriate command button the transmitter then broadcasts through air, such as by radio frequency transmission, the desired action to be taken which is then received by the receiver. Upon reception the radio frequency transmission is decoded in order to interpret the driver's desired command which is then implemented through the driver circuitry which supplies the appropriate control signals to the cruise control system. The primary objective of the present invention is to provide an aftermarket cruise control command apparatus which can be installed without modification to a vehicle steering wheel or steering column. A further object of the present invention is to provide a radio frequency communication link between the driver and the cruise control that is safe from outside interference such as transmissions from other automobiles. Another object of the present invention is to provide a cruise control apparatus small in size in order to accommodate the space limitations presented by different vehicles. This along with objects and advantages of the present invention will become more readily apparent from a reading of the detailed description taken in conjunction with the drawings and the claims.

In a preferred embodiment, the invention is directed to a control system for controlling a vehicle-speed control system comprising a control unit having at least one selectively actuated control transducer to generate first control signals, and a transmitter receiving said control signals for encoding and generating transmission signals through air. The control unit may be selectively mountable to a portion of a vehicle. A receiver is provided for receiving and decoding the transmission signals. A control circuit is coupled to the receiver to receive the decoded control signals and to generate second control signals used to actuate a speed control system associated with the vehicle. In another aspect, the invention is directed to a cruise control system for a vehicle comprising a speed control system coupled to the vehicle to selectively control and maintain the speed of said vehicle. A transmitter module including at least one user actuated transducer generates first control signals, and a transmitter receiving the first control signals and transmitting the control signals through air. A receiver module receives the first control signals through air, and includes a control circuit to convert the first control signals to second control signals. The second control signals are supplied to and operate the speed control system.

BRIEF DESCRIPTION OF THE DRAWINGS

FIG. 4 is a more detailed block diagram of both the receiver and transmitter of the present cruise control system;

FIG. 5 is a detailed block diagram of the physical components of the transmitter;

FIG. 7 is a detailed block diagram of the physical components of the receiver;

FIG. 9 is a block diagram of alternative embodiments of the receiver;

DETAILED DESCRIPTION OF THE PREFERRED EMBODIMENT

Figure 1:
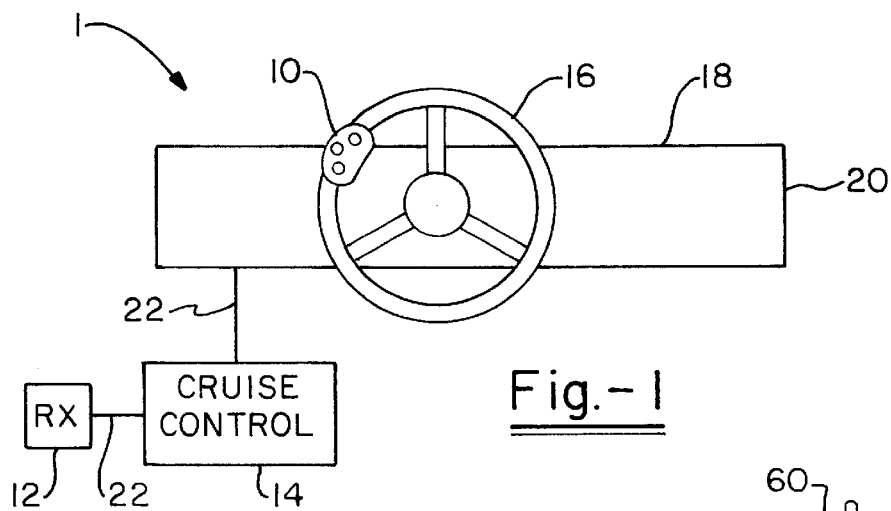
FIG. 1 shows a cruise control system in accordance with the present invention.

The wireless cruise control apparatus 1 is shown in FIG. 1. A transmitter module 10 my be fastened onto steering wheel 16, which is shown in relation to dashboard 18 of an automobile generally. Represented in block diagram format are cruise control or speed control system 14 and a receiver module 12. Cruise control 14 is electrically and mechanically coupled to vehicle 20 and performs the actual functions of regulating vehicle 20's speed at a predetermined value set by a driver. Receiver 12 is electrically coupled to cruise control 14 and relays control signals or commands to cruise control 14 from the user. The standard commands used by a driver consist of setting the cruise control system 14 to maintain the speed or vehicle 20 at a predetermined value, turning on and off cruise control 14, coasting of decelerating, and resuming speed or accelerating. In use, a driver enters commands for cruise control 14 by pressing the control buttons or transducers of transmitter 10, which is turn sends control signals through air from its position on steering wheel 16 to receiver 12. The receiver 12 then relays the commands to cruise control 14. While in the preferred embodiment, transmitter 10 is attached to steering wheel 16, it is not limited to this and may be selectively mounted in any convenient location for user access. Alternatively, transmitter 10 could take many forms such as one similar to a remote control for a television set allowing the driver to keep the remote control transmitter at his side. By attaching transmitter 10 to steering wheel 16 and mounting receiver 12 and cruise control 14 under dashboard 18, the wireless cruise control apparatus 1 takes up very little space and eliminates all associated problems of hardwired electrical coupling of control buttons from steering wheel 16 to cruise control 14.

Figure 2:
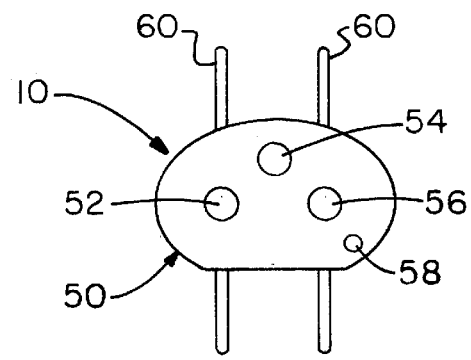
FIG. 2 is a front elevational view of the preferred embodiment of the transmitter.

A preferred embodiment transmitter 10 is shown in FIG. 2. Transmitter module 10 may comprise an enclosure 50, fastening straps 60, a plurality of control transducers, and indicator 58. Enclosure 50 in the preferred embodiment is fabricated from plastic, due to plastic's ease of molding and inexpensive nature; although, other materials could be used. Enclosure 50 may be contoured so that both functionally and aesthetically it attaches to steering wheel 16 appropriately. Fastening straps 60 or other suitable fasteners are fixedly attached to enclosure 50 and provide the mounting means for transmitter 10. Fastening straps 60, in the preferred embodiment, will consist of hook-and-loop fastening mechanisms; although, many other fastening straps known in the art could be used, such as molded resistive clips, wire ties, or other mechanical means. In the preferred embodiment, transmitter 10 is equipped with three user-control transducers, which are nothing more than buttons allowing the user to depress and transmit commands to cruise control 14. On/off button 56 allows the user to turn on and off cruise control 14. Set/decelerate button 54 allows the driver to set cruise control 14 to maintain vehicle 20's speed at the time of depressing the set/decelerate button 54. If the speed has already been set by the driver and the set/decelerate button 54 is depressed again, vehicle 20 will decelerate by a predetermined amount or as long as button 54 is depressed. Resume/accelerate button 52 allows the driver, upon it depression, to resume an already set speed when the driver desires. If vehicle 20 is already traveling at a set speed, a driver may press the resume/accelerate button 52 and a new speed will be set at a predetermined increment greater than the original set speed. Indicator 58 illuminates whenever any button of transmitter 10 is depressed signalling the driver that the command has been acknowledged. All of the previous commands are predetermined by cruise control 14 and are generally conventional in the cruise control industry. Other control functions are possible and contemplated in the invention.

All of the control transducers will be described in more detail later, but a brief example of how they function will now be given. In normal operation, a driver operating a vehicle will decide for one reason or another (typically due to long trips on highways), to use the cruise control. The driver depresses on/off button 56, at which point indicator 58 will illuminate. Once the driver reaches the desired speed, he will press the set/decelerate button 54, and the speed at which the vehicle is traveling just prior to depressing the set/decelerate button 54 will then be automatically maintained by cruise control 14. If for some reason the preset speed is too fast, the driver may press the set/decelerate button 54 and the maintained speed will decrease gradually or by a predetermined amount, such typical amounts being 5 to 10 mph. The driver may also decide to increase the set speed gradually or by a predetermined amount by simply pressing resume/accelerate button 52. Another typical situation is that the vehicle is traveling at a set speed, using cruise control 14, when the driver for one reason or another must brake. After the vehicle has slowed, and conditions clear, the driver may wish to resume the preset speed, in which case he can press resume/accelerate button 52 and cruise control 14 will cause the vehicle to accelerate to its previous preset speed.

Figure 3A:
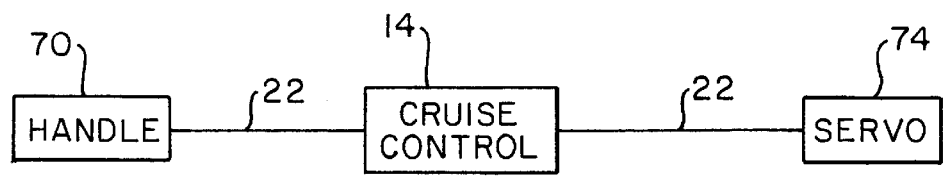
FIG. 3a is a block diagram of cruise control systems of the prior art.
Figure 3B:
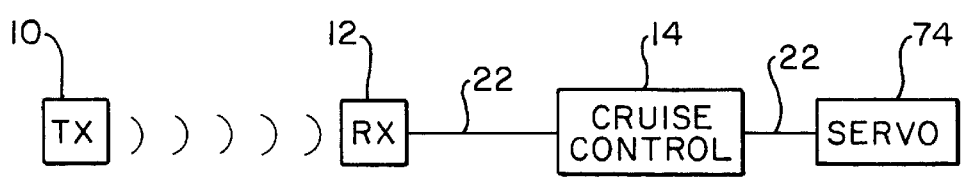
FIG. 3b is a block diagram of the cruise control system of the present invention.

FIGS. 3a and 3b demonstrate in block diagram format the comparison between prior art cruise control systems and the wireless cruise control apparatus 1 of the present invention. As shown in FIG. 3a, the prior art consists of cruise control 14 being hard wired and electrically coupled to a handle control mechanism 70 by means of wiring 22. A driver entered commands at handle 70 which were transmitted through the hard wire electrical coupling 22 to cruise control 14 which then relayed and controlled servo 74. Servo 74 actually controlled the throttle of vehicle 20 by being mechanically coupled to the throttle. While hardwire electrical coupling 22 is conventional for factory-installed cruise control systems, it presents numerous problems in the cruise control aftermarket. The present invention, as shown in FIG. 3b, avoids problems, such as difficulty in running hardwire electrical coupling 22 through the steering column. The invention also avoids the difficulties encountered today with the increased use of airbags. As previously mentioned, not only do airbags make running wires through the steering column more difficult, but in may cases modification of the steering column will void vehicle warranties. Additionally, the opportunity to damage the airbag and create an unsafe driving condition exists anytime aftermarket modification is done to the steering column. In FIG. 3b, the cruise control system 14 is electrically coupled via 22 to servo 74, and cruise control 14 in cooperation with servo 74 controls vehicle speed in the same manner. The advantages of the present invention are in the use of transmitter 10 and receiver 12 to communicate controls from the driver to cruise control 14 without any hardwire electrical coupling 22. Receiver 12 is hardwire electrically coupled 22 to cruise control 14 and, upon receiving commands from transmitter 10, functions with regard to cruise control 14 similar to when commands were received from handle 70 in FIG. 3a.

FIG. 4 shows a more detailed block diagram of a preferred embodiment of the wireless cruise control apparatus 1. Receiver 12 comprises microcontroller 100, decoder 104, setup unit circuitry 110, driver unit circuitry 102, and RF input circuitry 110. In the preferred embodiment, RF transmission of control signals may be used. When transmitter 10 broadcasts radio frequency signals, RF input circuitry 110 detects the signal and couples the signal to decoder 104. Decoder 104 then translates the analog radio frequency signal into binary digital data which microcontroller 100 is capable of receiving and interpreting. Based on the information contained in the radio frequency signal, microcontroller 100 will determine which input transducer 108 was depressed by the driver.

Microcontroller 100 also receives digital information from set-up unit circuitry 110. Set-up unit circuitry 110 may be comprised of a plurality of digital inputs which microcontroller 100 uses to determine the type of cruise control system it is electrically coupled to, and what security address is being used to ensure that only the corresponding transmitter 10 can cause microcontroller 100 to change the settings of cruise control 14. Set-up unit circuitry 110 and the functions of its digital inputs will be described in detail later. Once microcontroller 100 has received the digital version of the radio frequency signals, and the digital set-up inputs, it then uses this information to generate second control signals, such as analog control signals needed to manipulate cruise control 14. Once microcontroller 100 has formulated the correct control signals, it transmits them to driver unit circuitry 102, which acts as a buffer between microcontroller 100 and cruise control 14 providing microcontroller 100 with some measure of isolation from external cruise control 14.

Transmitter 10 is comprised of input transducer circuitry 108, encoder 106, and RF output circuitry 112. Input transducer circuitry 108 receives input from the driver and translates the input into digital information which can be read by encoder 106. Encoder 106, in turn, translates the driver's input commands into the appropriate format for transmission and delivers the information to the RF output circuitry 112, which translates the digital information into an analog radio frequency output signal and broadcasts the signal into the airwaves for reception by receiver 12.

FIG. 5 presents a more detailed functional diagram of transmitter 10. Transmitter 10 generates an on/off keying AM radio frequency signal. The data corresponding to momentary switch 132's selection and a security code set by jumpers 134 is modulated onto a carrier frequency, and broadcast via radio frequency to receiver 12. Digital encoder 104 translates data from momentary switches 132 and jumpers 134 and transmits the data as a serial bit stream. In a particular example, there may be 318 possible combinations of the security code and momentary switch 132 input which can be accommodated. Battery 138 provides power to transmitter 10. For different modulation approaches, a correspondingly different design would be required and is contemplated in the invention.

Three switches 132 serve as input to encoder 104. These switches 132 may be momentary switches which correspond to the user selectable signals for the cruise control functions. Encoder 104 is centrally comprised about an encoder IC, A suitable encoder IC is manufactured by Holtek (P/N HT640) but other encoders from other manufacturers or a simple microcontroller could be used. The other inputs to the encoder are from the code-selection jumpers 134. Jumpers 134 may be set at the factory via factory-personnel "shorting" the appropriate connections. Encoder 104 takes the security code jumpers 134 along with input from momentary switches 132 and outputs the corresponding serial data stream. This signal is modulated onto a carrier frequency by on/off keying RF oscillator 136 which may be centered at 418 Mhz as an example. RF oscillator 136 couples the modulated signal to antenna 130.

Figure 6:
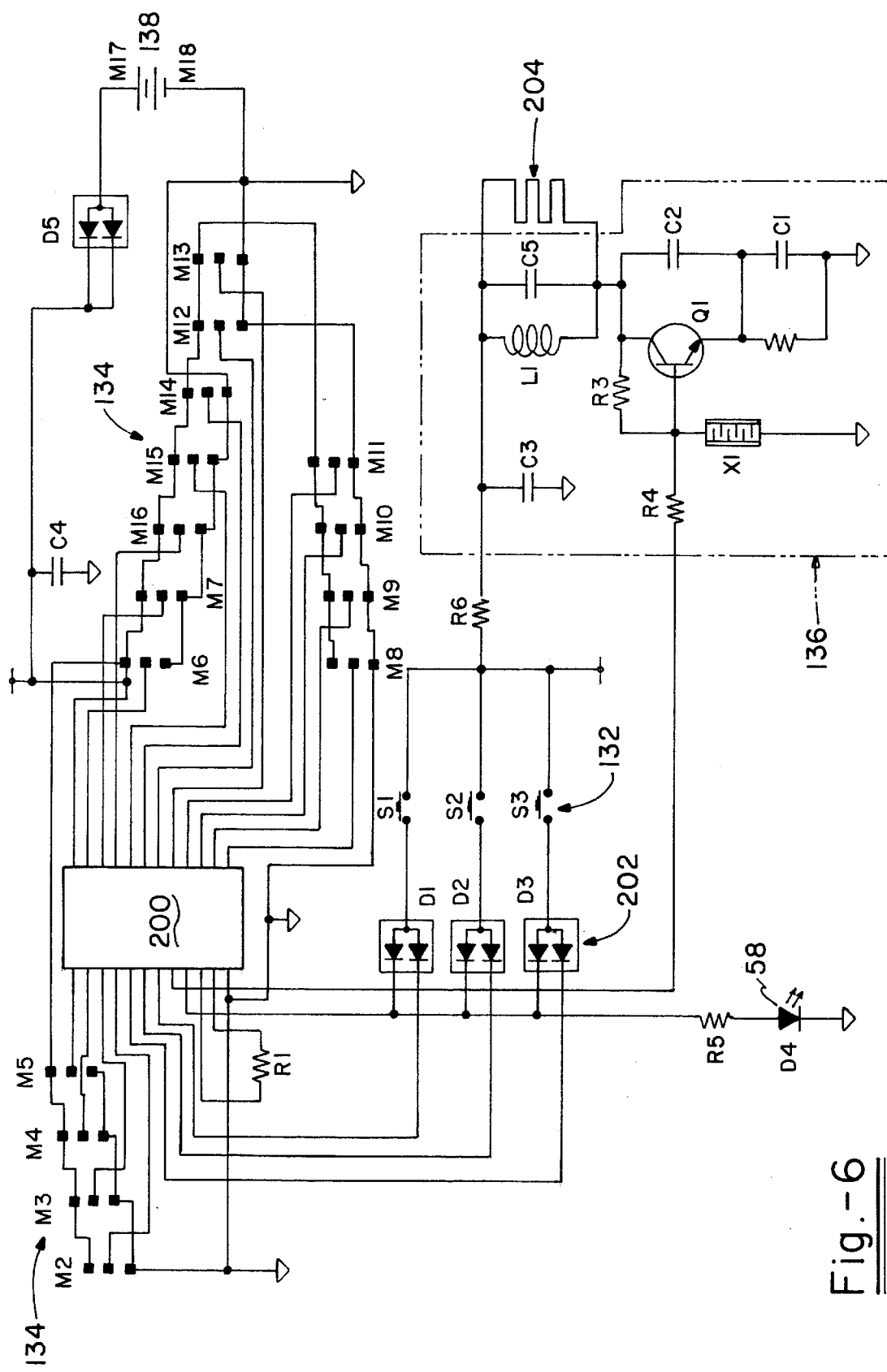
FIG. 6 is a schematic diagram of the preferred embodiment of the transmitter.

FIG. 6 shows the actual schematic of the preferred embodiment of transmitter 10. An encoder 200, such as a Holtek HT64U, encoder, contains the circuitry for converting parallel input from security jumpers 134 and momentary switches 132 into a serial bit stream. Security jumpers 134 are shown as pads M2 to M16 on the circuit diagram. S1, S2 and S3 are the user momentary switches 132. Momentary switch 132 signals flow through diode packages D1, D2 and D3, generally designated 202, to encoder IC 200 and also to indicator 58 D4 which is a Light emitting diode. Oscillator 136 consists of R4, R3, X1, Q1, C2, R2, C1, L1, C5, C3 and antenna 204. The oscillator selectivity is principally determined by a SAW resonator although other oscillator configurations could be used including multiplied crystals, synthesizers, L/C oscillators, pierce, microstrip, hartley, etc. Antenna 204 is a printed element on the PCB although this could also take the form of another antenna structure with appropriate design changes. Battery 138 provides DC power to the transmitter circuitry.

The link between receiver 12 and transmitter 10 may be completed via radio frequency transmission. Several other communications mediums could be used (e.g. infrared or ultrasonic) but in the preferred embodiment the RF approach offers the most reliable medium. For the present embodiment, simple OOK (On/Off keying) of an AM (amplitude modulation) nature may be used to convey the information from transmitter 10 to receiver 12 on a carrier frequency, such as 418 Mhz. With appropriate circuit changes, other frequencies or modulation approaches could be used.

The preferred embodiment employs a conventional superheterodyne AM receiver as shown in FIG. 7. Other types of receivers could also be used, e.g., direct detection, superregenerative, regenerative, ASH, etc. For other modulation approaches, another appropriate receiver matching the modulation approach would be required.

The RF signal from transmitter 10 flows into receiver antenna 130. Antenna 130 can be implemented in a loop structure. A front-end filter 225 centered at the carrier frequency is used to provide selectivity. From the bandpass filter, the signal flows into mixer 227 whereby the signal is downconverted to a 500 to 800 khz intermediate frequency (IF). The other input to the mixer, local-oscillator 229, provides the signal to accomplish this frequency translation and is centered at a predetermined frequency, such as 417.5 Mhz. The IF signal is amplified by amplifier 230, and then flows through L/C low-pass filter 232 and is limited/amplified via limiter 234. The signal may then be further filtered by filter 236, buffered by buffer 238, and fed to self-centering comparator 240 for AM detection. Comparator 240's output is a digital level signal that serves as input to microcontroller 100. IC regulator 258 provides a stable regulated voltage for receiver 12. Microcontroller 100 contains firmware to implement the instruction code and perform decoding functions for the incoming data stream. A bank of switches 250 serves as additional input to microcontroller 100 for selecting the manufacturers cruise-control system in use. The microcontroller 100 is programmable and allows the receiver module to be set for detecting control signals from the transmitter and translating the signals to instructions to operate any type of speed control system. The switches 250 may configure the receiver for various known speed control systems such as produced by SCS/Ford, General Motors and Rostra as examples. Switch 252 provides a manual override for cruise control 14 by switching off an input signal to microcontroller 100. Microcontroller 100 may be supplied by an external oscillator 254, which may be chosen to be 4 Mhz. The three outputs from microcontroller 100 are coupled to level shifters 256 via transistors to drive the appropriate output signals for cruise control 14. The output signals generated by the receiver module correspond to the logical functions implemented by the user via the transmitter 10. In the preferred embodiment, the transmitter 10 may have three switches 52, 54 and 56 as previously described, with each of the switches performing a distinct function or functions in operation of the speed control system. The actual output states of the output pins associated with the interface between the receiver module and the speed control device is determined by the type of vehicle or type of speed control system with which the control system is used. The type of vehicle or speed control system may be defined or programmed in the microprocessor 100 for any particular type of speed control system, and more or less control switches or functions may be performed as desired.

Figure 8:
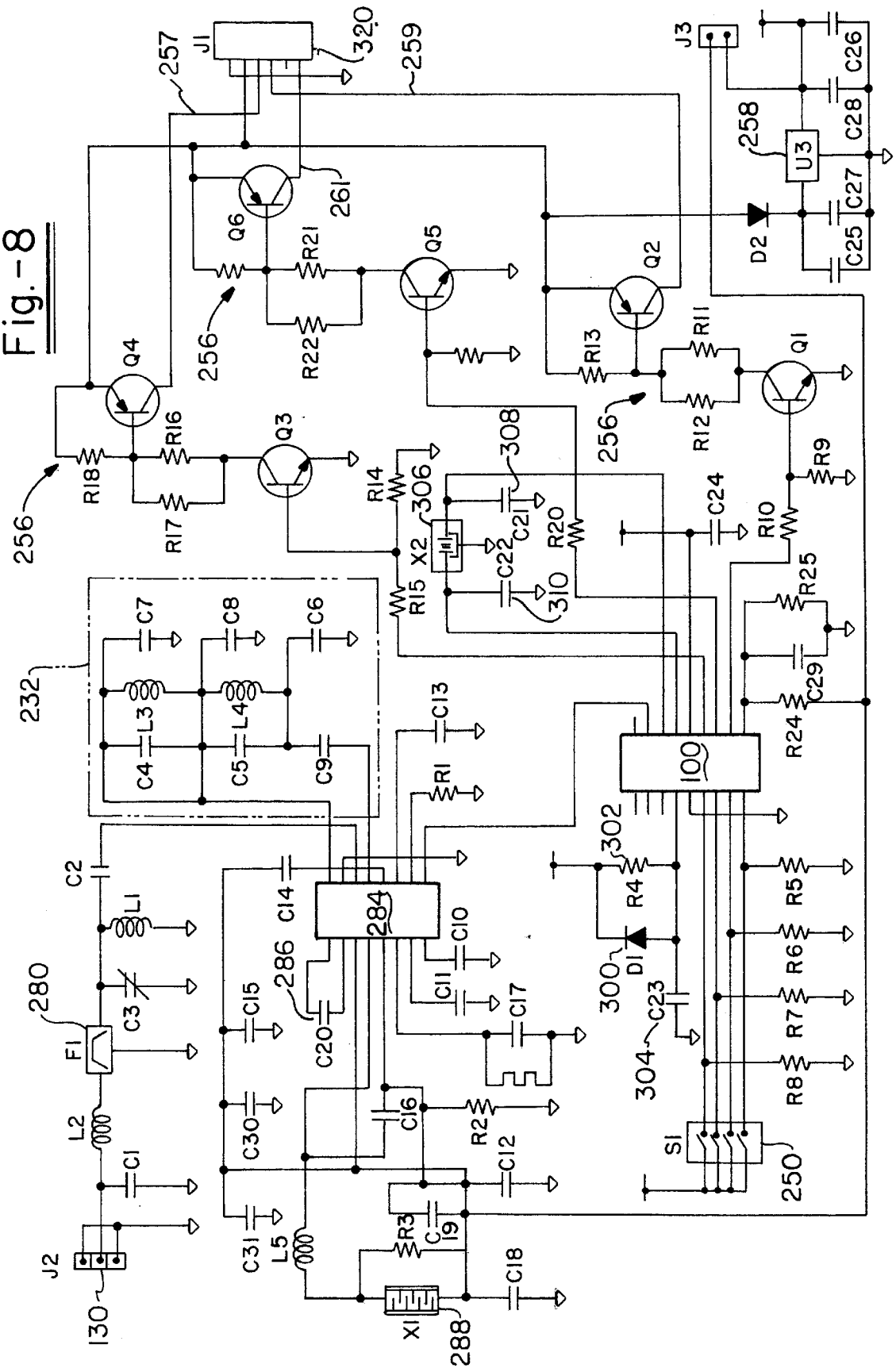
FIG. 8 is a schematic diagram of the preferred embodiment of the receiver.

A component-level description for the preferred embodiment follows, as shown in FIG. 8. In the embodiment shown, it is noted that mixer 227, amplifier 230, limiter 234, and buffer 238 are contained within IC 275, a suitable IC described by Phillips Corp. as a UAA3201 AM Detector 284.

Receiving antenna 130 may be in the form of a loop, printed on the printed-circuit-board (PCB). This structure was chosen due to its inherent high Q (Quality Factor) and its resultant improved selectivity. Several other antenna designs could be used.. e.g., wire, dipole, patch, microstrip, etc.

Front end filter 280 is a SAW (Surface Acoustic Wave) device although other forms could be used . . . e.g. ceramic, L/C, microstrip, helical, etc. Components CI, L2, C3, L1, and C2 makeup impedance match 282.

Mixer 227 and amplifier 230 are contained within AM Detector IC 284. A capacitor C2 286 may be provided between mixer 227 and amplifier 230 for proper operation of the IC. Oscillator 229 generates a frequency of 417.5 Mhz via the active elements of AM Detector IC 284 in cooperation with components X1, R3, C18, C19, C12, C16, L5, and R2. These components provide biasing for AM Detector IC 284 with the main frequency-determining element being SAW resonator 288.

Low-pass filter 232 is composed of C4, L3, C7, C8, C5, L4, C6, and C9. Additional discrete passive components are shown in the schematic of FIG. 8 and may be provided for the proper operation of AM Detector IC 284 as recommended by the manufacturer.

Microcontroller 100 may be an integrated circuit, with a suitable IC manufactured by Microchip. Other microcontrollers could be used including, but not limited to, Motorola, National, NEC, Phillips, Intel etc. Components D1 300, R4 302, and C23 304 provide a proper reset function for microcontroller 100. Ceramic resonator X2 306, and capacitors 308 C21 and C22 310 provide the timing components for oscillator 254. Components R5–R8 provide terminations for the microcontroller's inputs. Components R24, R25 and C29 provide filtering and termination for the manual-override switch connected to J3. Dip switch bank 250 provides user selection input data which instructs microcontroller 100 as to what type of vehicle cruise control 14 the receiver module is coupled to, allowing it to output proper signals for operation of that particular cruise control 14.

The set of components R15, R14, Q3, R17, R16, Q4, and R18 are repeated in triplicate for each of the three outputs which form each Buffer/level transducer 256. The other sets of components—identical in function—are R20, R19, Q5, R22, R21, Q6, R23 and R10, R9, R12, R11, Q2, R13. These components provide level shifting and buffering between the low-level drive capabilities of microcontroller 100 and the higher voltage and current requirements of cruise control 14's inputs.

IC regulator 258 (Q/N 78LO5) provides a stable DC voltage signal. Components D2, C25, C27, C28, C15, C30, C31, C17 and C26 provide filtering, decoupling, and reverse-power protection for regulator 258. The buffered and level shifted signals output from each buffer/level translator 256 are coupled to cruise control 14 via output interface connector 320.

Figure 10:
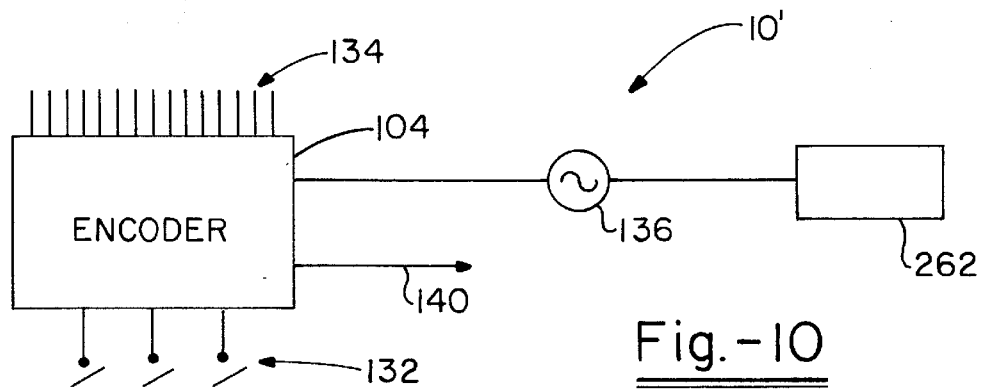
FIG. 10 is a block diagram of alternative embodiments of the transmitter.

While the preferred embodiment employs AM superheterodyne communications, other means of data communication are contemplated. FIG. 9 and FIG. 10 respectfully show transmitter 10 and receiver 12 with alternative transmit and receive circuitry. Transmit circuitry 262 and receive circuitry 260 could be implemented with infra-red emitters and detectors. Data communication could also be implemented by using ultrasonic transducers as the transmit 262 and receive 260 circuitry.

The operation of wireless cruise control apparatus 1 will now be described with terms and the following definitions applied throughout. Input Stream is a self clocking bit stream presented to microprocessor 100 from receiver 12. It is self clocking in that the start of every new bit (whether a High Bit or a Low Bit) is indicated by a transition from a high state to a low state. A bit stream consists of a series of bits which are defined by their nature as either a High Bit or a Low Bit.

Starting with a transition from high to low, a High Bit is defined as a 2.56 ms period of time in which the first ⅓ of this period (0.853 ms) is a low state and the last ⅔ of this period (1.706 ms) is a high state.

Starting with a transition from high to low, a Low Bit is defined as a 2.56 ms period of time in which the first ⅔ of this period (1.706 ms) is a low state and the last ⅓ of this period (0.853 ms) is a high state. A Message is a collection of 36 bits of data from the bit stream. The Message is logically viewed as consisting of an Address portion and a Data portion. The first 30 bits of data represent the Address portion of the Message and the last 6 bits of data represent the Data portion of the Message. An Address is a collection of 30 bits of data from the first 30 bits of the Message. The bits represent a unique address by which microprocessor 100 identifies the Message as being intended for itself. Any Message received, in which all 30 of these bits do not match the address held in microprocessor 100 as its own, is discarded. Microprocessor 100 learns its own address through a special Learn Mode that occurs after every Power On Reset (POR).

Data is defined as a collection of 6 bits from the last 6 bits of the Message. These bits are logically paired to represent 3 states. These states represent the position of their corresponding momentary switches 132 on transmitter 10 (either pressed or not pressed). In order for a state to be considered valid, both bits must match. The current definition for a momentary switch 132 being pressed is that both bits that represent its state must be Low Bits. All other combinations are considered not pressed.

POR is the state in which all power to microprocessor 100 has previously been removed and is then reapplied. Learn Mode is the process that occurs after a POR by which microprocessor 100 learns what its address is. On POR, a flag that is used to determine whether or not microprocessor 100 has an address defined is set to FALSE. Whenever a Message comes in, microprocessor 100 checks this flag. If this flag is set to TRUE then microprocessor 100 simply compares the address in the Message against its own. If this flag is FALSE, however, microprocessor 100 temporarily saves the Address that is in the Message, but does not set the flag to TRUE. If microprocessor 100 receives the same Address in three consecutive, but distinct Messages, then it defines this Address as its own and sets the flag to TRUE.

Finally, Preamble is defined as a series of two bits that are tacked on to the front of the Bit Stream by transmitter 10. These bits are used to establish the beginning of a message by receiver 12 and to provide a means by which receiver 12 can synchronize the incoming Bit Stream.

Figure 11:
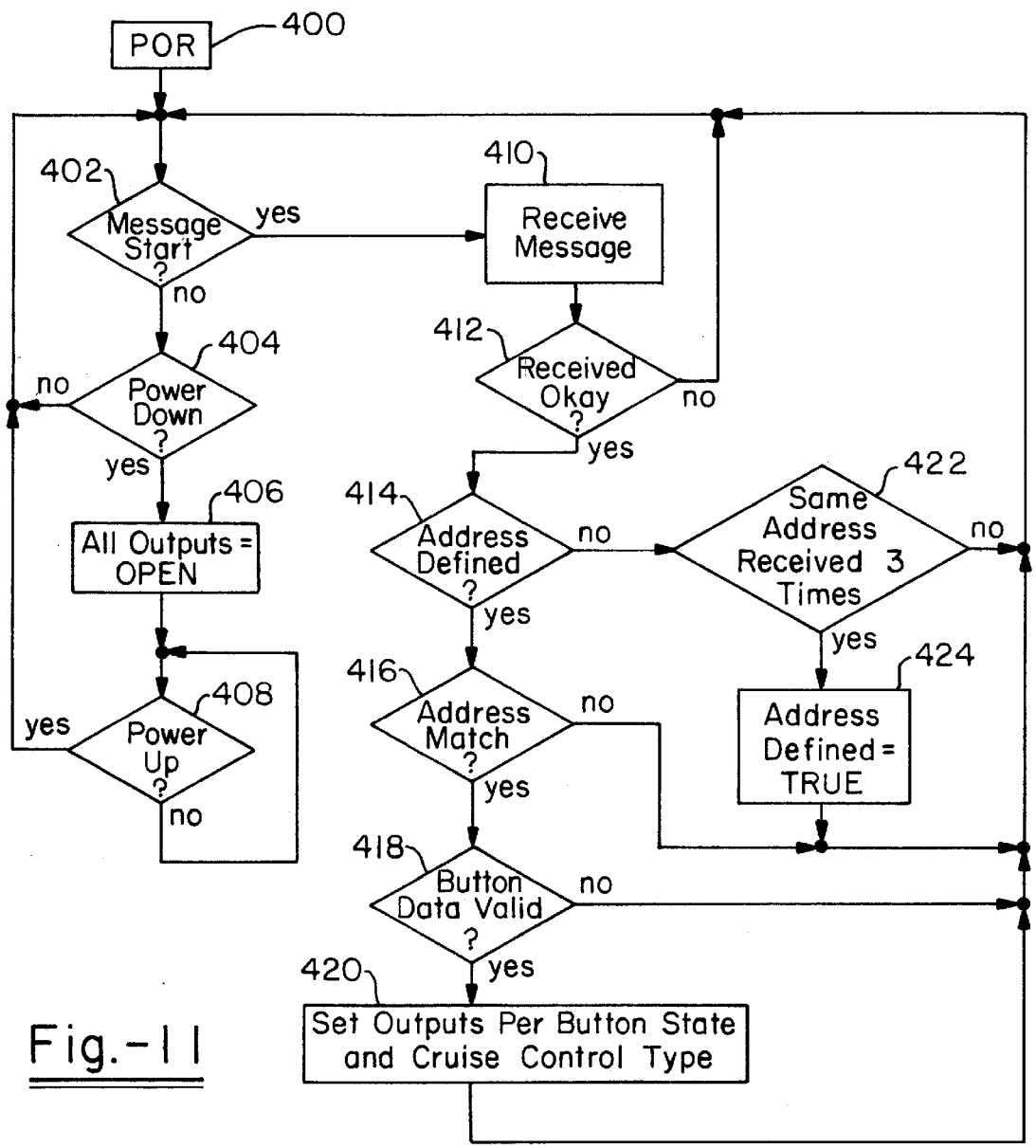
FIG. 11 is a flow chart of the overall operation of the wireless cruise control apparatus.

In conjunction with FIG. 11, which depicts the operation of wireless cruise control apparatus 1 in flow-chart format, the operation is as follows:

On initial POR 400, the unit performs actions to setup microprocessor 100 preparing it to run the application software. These actions are only performed once at POR 400. The following sequence occurs: I/O ports are setup such that all output pins are configured as outputs, and all input pins are configured as inputs. The internal timer is set such that it will run at the desired period of time when utilized by the application. The flag that indicates whether or not microprocessor 100 has an address defined is set to FALSE. All the outputs are set to the OPEN state, which is driven low. Dip switch 250 is read and a variable used to determine the type of car that the system is configured for is set to the appropriate value.

After the above POR 400 functions have been run the unit enters an infinite loop. Within this loop, essentially two things occur. The unit looks for the start of an incoming message (and if one is detected it runs other functions to process it) and it looks for the power down input to indicate that the unit has been powered down.

From the point of view of microprocessor 100, the term Power Down refers to something different than would normally be associated with it. Microprocessor 100 itself is never actually powered down. Even when vehicle 20 is off, microprocessor 100 will remain powered so it does not lose its address definition. The rest of the circuitry in receiver 12, is however, truly powered down when vehicle 20 is off. One of the inputs to microprocessor 100 is the state of the power in the circuit. This is what is checked in this function. Microprocessor 100 enters this function to check the state of the input to determine if the rest of the circuit has been powered down. If it finds that it has not then it exits this function and returns to the Main Loop. If the input state does indicate a power down condition, then microprocessor 100 will set all the outputs to the OPEN state, reset any flags associated with message receipts to their default state, and then enter a loop that waits for the power down input to return to a power up state. Once this input changes back to a power up state, the function is exited and microprocessor 100 returns to the Main Loop. The invention is designed to work for a variety of conventional cruise control systems available, such as produced by SCS for Ford vehicles, or as provided by General Motors or Rostra as examples. The operation of the microprocessor may correspond to the particular type of speed control system with which the control system 1 of the invention is used. As a particular example, if vehicle 20 is defined as either a Ford or SCS_Handle then one additional step may be performed before the outputs are set to OPEN. In this case the outputs are set to the Stop state, as defined for a Ford or SCS_Handle cruise control 14. The state is maintained for 250 ms and then the outputs are set to the OPEN state. Other cruise control systems may require other such distinctions in the particular implementation of the invention, and all such operational characteristics are evident to one skilled in the art and are contemplated herein. The microprocessor 100 is programmable to accommodate any cruise control or speed control system.

Message start 402 is initially indicated by the state of the Bit Stream input pin going high. If, when this function is entered, the input is not high, then this function will immediately exit and return to the Main Loop. If the input is high, then this function goes into a Preamble Detection mode. Every message that is sent from transmitter 10 has a two-bit Preamble attached to it to indicate the start of a message and to allow receiver 12 to establish synchronization with the incoming message. The Preamble is described in the Definition of Terms section. This function looks for the complete Preamble and if it is detected, it returns a value indicating that the start of a message has occurred. If the complete preamble is not present then this function returns a value indicating that the start of a message has not occurred. If the start of a message has occurred then the Main Loop will proceed to Receive Message 410.

After Message Start 402 has been recognized, microprocessor 100 then proceeds to a Receive Message 410. This may be a two step process, wherein the first is actually resolving the Bit Stream into its component bits and storing that as the Message. The second is Validating the Message. If the message is determined to be invalid then this function returns a value indicating that the Message received was not valid 418. If the Message is determined to be valid, then this function returns a value that indicates that the Message received was valid. If the Message received is valid, then the Main Loop performs some action based on the contents of the Data in the Message 420. Resolving the bit stream is a matter of timing. As described in the Definition of Terms, both High Bits and Low Bits are defined in terms of time. Both types of bits are defined as a period of time in which several states occur. The period of time for each is the same. In both cases, the start of this time period is determined by a transition from high to low. This is called the falling edge. In both cases, the type of bit can be determined as the state of the input at the period of time that is ½ of the full bit time from the falling edge. The bit detection method used in this application does essentially this, but will be explained in detail later.

Once Message Receive 410 has been determined, a timer is set such that it will expire in the middle of the first bit in the incoming message. Once the message receiving function is entered, it enters a loop that is set up to do the following for all 36 of the expected bits that constitute a Message. The function waits for the expiration of the half bit timer. It then reads the state of this bit and adds it to the bit position in the Message that corresponds to the bit that it is currently trying to resolve (1 of 36). It then waits for the next falling edge to indicate the start of the next bit's period. On detection of the falling edge, the half bit timer is reset such that it will expire in the middle of the next bit. It then goes back to the start of the loop to resolve the next bit. Retriggering the half bit timer on the falling edge of each bit takes advantage of the self-clocking nature of the Bit Stream to ensure that microprocessor 100 stays synchronized with the incoming Bit Stream whose actual bit periods will vary from the nominal period with variations in tolerances in component parts used in manufacturing and variations in operating temperature and humidity. Once all 36 bits have been received and stored as the Message, the Message is then validated. Additionally, the falling edge described above must occur within a period of time no greater than the period bit from the half point determined from the previous falling edge. If the falling edge is not detected within this period of time, then the whole message is considered to be invalid and the loop is exited, and so is the receiving function. In this case, a value indicating that the Message is invalid is returned.

The actual value of a bit (High Bit or Low Bit) is not quite as simple as looking at the state of the input pin and calling that the value. This application uses a more sophisticated method of state determination referred to as majority polling. In majority polling, the input pin's state is actually read many times. The number of times the input was read high and the number of times the input was read low is saved. After all the readings have occurred, then the actual state of the input is said to be the state with the majority of the votes. In this application, the input state is read 84 times. If the input is read as a High Bit, a variable used to keep track of the voting is incremented. If the input is read as a Low Bit, the same variable is decremented. If, after all 84 reads, the voting variable is a positive value, then the actual state of the input is said to be a High Bit. If the value of the polling variable is negative, then the input is a Low Bit. This method of Bit State Determination is used to increase the apparatus 1's immunity to electrical noise. Because a car is typically a very noisy system, this method has been employed to eliminate the chances of any mistakes being made in the reading of the Message and to ensure that every message transmitted will be received by microprocessor 100.

The second part of Receiving a Message is validation. A message is said to be valid if its Address portion contains an address that matches the currently defined address of microprocessor 100 and the Data portion of the message contains Valid Data.

It is at this point that the application can be said to diverge into two distinct modes of operation. The first would be considered Normal Operation and the second is called Learn Mode. Learn Mode and how and when it is utilized is described in the Definition of Terms section. If microprocessor 100 is in Learn Mode, then its address is undefined and by definition, the Message is considered to be invalid.

In Normal Operation, microprocessor 100 has an address defined by which it can compare the one contained in the Message. The message is considered invalid if the Address contained in the Message does not exactly match the address defined in microprocessor 100.

Data must conform to the criteria described in the Definition of Terms section for Data when it is evaluated by the Action function 420, but there are no combinations of momentary switches 132 that are currently considered illegal. For example, it is perfectly legal to have any two switches 132 depressed at the same time or all three switches 132 pressed at the same time. The Action function 420 will simply create an output condition for each one of the switches 132, corresponding to switches 52, 54 and 56 as described with respect to FIG. 2. The momentary switch 132 states are examined individually and in series, so the resulting output states will simply be the state determined by the last switch 132 examined by the software. This currently corresponds to what has been mapped as the Set/Coast switch 54 for example.

As described previously, each momentary switch 132 (switches 52, 54 and 56) has a corresponding output action, with the microprocessor 100 generating output control signals supplied to the output pins 257, 259 and 261 of the output interface. The actual states of the three output pins 257, 259 and 261 of the output interface are determined by what kind of vehicle 20 or particular speed control system is defined in microprocessor 100. The following Table 1 provides examples of possible logical functions performed by means of the switches or transducers 52, 54 and 56 for a variety of speed control systems associated with various vehicle types. The receiver and output pins 257, 259 and 261 thereof are then configured to match the functions of each switch 52, 54 and 56. Again, the invention is adaptable to any type of speed control system, with microprocessor 100 being programmable for implementation with any system. As merely an example in conjunction with the preferred embodiment, the output states of the output interface pins 257, 259 and 261 to which the output signals are supplied may be mapped for each switch 52, 54 or 56 function according to the type of speed control system according to the following Table 1:

TABLE 1

|  | OUTPUT 257 | OUTPUT 259 | OUTPUT 261 |
|---|---|---|---|
| ROSTRA FUNCTION |  |  |  |
| OFF | OPEN | OPEN | OPEN |
| ON | +V | OPEN | +V |
| SET/COAST | +V | +V | OPEN |
| RESUME/ACC | +V | +V | +V |
| GENERAL MOTORS FUNCTIONS |  |  |  |
| OFF | OPEN | OPEN | OPEN |
| ON | +V | OPEN | OPEN |
| SET/COAST | +V | OPEN | +V(momentary) |
| RESUME/ ACCEL | +V | +V(momentary) | OPEN |
| FORD/SCS FUNCTIONS |  |  |  |
| OFF | OPEN | +V | OPEN |
| ON/RESUME/ ACCEL | +V | OPEN | OPEN |
| SET/COAST | OPEN | OPEN | +V |

The logical functions of the switches 52, 54 and 56 corresponding to the above output states for these particular types of vehicles or speed control systems are listed in Table 2.

TABLE 2

|  | FORD | SCS | ROSTRA | GENERAL MOTORS |
|---|---|---|---|---|
| SWITCH 52 | OFF | OFF | RES/ACCEL | RES/ACCEL |
| SWITCH 54 | SET/COAST | SET/COAST | SET/COAST | SET/COAST |
| SWITCH 56 | ON/RES/ ACCEL | ON/RES/ ACCEL | ON/OFF | ON/OFF |

The state of the outputs correspond to the switch actuated by the user, and the state of the cruise control system as currently set. In general, the switches 52, 54 and 56 may perform the logical functions: On/Off, Accelerate/Resume, and Set/Coast. More specifically with respect to the preferred embodiment, On/Off 56 may act as a toggle switch. If the state of the cruise control is Off, and On/Off 56 is pressed, the state of cruise control 14 is toggled to On and the output pins are driven to the states corresponding to an ON for the type of vehicle 20 that is defined. If the state of cruise control 14 is On and the On/Off button is pressed, the state of the cruise control is toggled to Off and the output pins are driven to the states corresponding to an OFF for the type of vehicle 20 that is defined.

In Table 2 above, it is seen that if the vehicle 20 type is a Ford or SCS__Handle, this switch 56 is viewed as being the logical functions of On/Resume/Accelerate. In this case, switch 56 acts as a momentary switch. A special timer may be utilized for this functionality. It is referred to as the "momentary timer" and it is set whenever a momentary switch 132 press of this type is received. If it expires, then the outputs are driven to their default state of OPEN. In the other vehicle types, the switch 56 may operate the functions as indicated, and again the functions of any of the switches may be adapted to any type of speed control system Table 1 shows the corresponding output states to perform these logical functions, which also may be adapted to any type of system.

In general, Accelerate/Resume 52 acts as a momentary switch. The momentary timer is utilized to perform this function. On receipt of this command, the outputs are driven to the state corresponding to Accelerate/Resume 52 for the type of car that is defined and the momentary timer is set. When the momentary timer expires, the outputs are driven to their default state of OPEN. In order for this command to be considered valid, and result in any action taken, cruise control 14 must currently be in the On state. As shown in Table 2, if the vehicle 20 type is a Ford or SCS__Handle, the microprocessor is reconfigured and this command is viewed as being the logical function of Off. In this case, the switch 52 acts as a momentary switch. The momentary timer is set on receipt of this button press and when it expires the outputs are driven to their default state of OPEN as shown in Table 1.

In general, Set/Accelerate 54 may act as a momentary switch. The momentary timer is utilized to perform this functionality. On receipt of this command press, the outputs are driven to the state corresponding to Set/Decelerate 54 for the type of vehicle 20 that is defined and the momentary timer is set. When the momentary timer expires, the outputs are driven to their default state of OPEN. In order for this command to be considered valid, and result in any action taken, cruise control 14 must currently be in the On state. This is true for all vehicle 20 types in the examples given.

Because the transmitted message is not simply sent once when a switch 132 is pressed, some additional flags are kept by the Action function 420 to deal with this. If a switch 132 is pressed and held down, the transmitted message is sent continuously with approximately 100 ms between messages. If it is just pressed briefly and then released, three of the same messages are sent by transmitter 10 with the same pause between each. In the case of the switches 132 that act as toggle functions, as each of these messages is received the state of cruise control 14 is continuously toggled back and forth. For example, with a 3 message burst, if the original state of cruise control 14 was set to OFF, the first message would toggle it to ON, the second to OFF, and the third to ON again. In the case of a continuous transmission, the unit would do many toggles and the final state would be determined by the number of messages sent. Clearly, this is not the desired result. To combat this problem, the invention may utilize the concept of Multimessages. Multimessages are said to be messages of the same type that are received within a specific period of time from each other. The current setting of this period is 250 ms. If a Multimessages condition occurs, the resulting action taken is whatever would have occurred if only one of this message had been received.

Those skilled in the art will recognize that the apparatus of the invention may be modified in terms of control circuitry or functions to operate a speed control system associated with a vehicle. Similarly, the configuration of the control or transmitter module, as well as the receiver module may vary while still providing the advantages of remote operation of a vehicle speed control system, and without hardwiring of the control module to the speed control system. While the foregoing description has set forth the preferred embodiments of the invention in particular detail, it must be understood that numerous modifications, substitutions, and changes may be undertaken without departing from the true spirit and scope of the present invention as defined by the ensuing claims.

What is claimed is:

1. A remote control for a vehicle cruise control comprising:
   a self contained control module having a power source, wherein said power source is electrically isolated from said vehicle, at least one selectively actuated control transducer to generate control signals and a transmitter receiving said control signals for transmitting said control signals through air, wherein said self contained control module is releaseably mountable to a portion of said vehicle;
   a receiver module for receiving said control signals; and
   a control circuit coupled to said receiver module which operates said vehicle cruise control associated with said vehicle based upon said control signals;
   wherein said transmitter is a radio frequency transmitter and said receiver is a radio frequency receiver.

2. The remote control of claim 1, wherein,
   said control module is provided in an enclosure including a fastening mechanism which is releasably mountable to a portion of said vehicle.

3. The remote control of claim 1, wherein,
   said control module includes a plurality of control transducers, each of which generates distinct control signals to operate a plurality of functions of said speed control system of said vehicle.

4. The remote control of claim 1, wherein
   said control module includes input transducer circuitry for said at least one control transducer to generate control signals which are supplied to an encoder to transform said control signals into a format for transmission which is in turn supplied to radio frequency output circuitry used to generate analog signals containing said control signals which are broadcast via an antenna.

5. The remote control of claim 1, wherein,
   said radio frequency receiver includes an antenna for receiving said radio frequency signals which are coupled to a filter circuit for selective reception of a predetermined frequency range.

6. The remote control of claim 5, wherein,
   said radio frequency receiver is coupled to said control circuit having a microcontroller wherein said microcontroller operates said speed control system based upon said control signals.

7. The remote control of claim 6, wherein,
   at least one input signal supplied to said microcontroller instructs said microcontroller to control one of a plurality of different speed control systems allowing said control system to be retrofitted within a plurality of different vehicles.

8. The remote control of claim 1, wherein,
   said control circuit includes an output interface which is coupled to said speed control system of said vehicle.

9. The remote control of claim 1, wherein,
   said control module includes a microcontroller used to interpret said control signals received by said receiver module, wherein said microcontroller verifies said control signals transmitted by said control module and rejects other signals which may be detected by said receiver module.

10. The remote control of claim 5, wherein, said microprocessor is programmed to control one of a plurality of different speed control systems.

11. A remote control for a vehicle cruise control comprising:

a control module having at least one selectively actuated control transducer to generate control signals and a transmitter receiving said control signals for transmitting said control signals through air, a receiver module for receiving said control signals; and a control circuit coupled to said receiver module which operates said vehicle cruise control associated with said vehicle based upon said control signals;

wherein said control circuit includes a microcontroller used to interpret said control signals received by said receiver module, wherein said microcontroller verifies said control signals transmitted by said control module and rejects other signals which may be detected by said receiver module;

said verification of said control signals includes comparison of said received control signals with predetermined information to validate receipt of said control signals and prevent operation of said vehicle cruise control unless said at least one control transducer is actuated by a user.

12. A remote control for a vehicle cruise control comprising:

a self contained control module having a power source, wherein said power source is electrically isolated from said vehicle, at least one selectively actuated control transducer to generate control signals and a transmitter receiving said control signals for transmitting said control signals through air, wherein said self contained control module is releaseably mountable to a portion of said vehicle;

a receiver module for receiving said control signals; and a control circuit coupled to said receiver module which operates said vehicle cruise control associated with said vehicle based upon said control signals;

wherein said transmitter is an ultrasonic transmitter and said receiver is an ultrasonic receiver.

13. A remote control for a vehicle cruise control comprising:

a self contained control module having a power source, wherein said power source is electrically isolated from said vehicle, at least one selectively actuated control transducer to generate control signals and a radio frequency transmitter including an antenna, said radio frequency transmitter receiving said control signals from said control transducer and radiating radio frequency signals containing said control signals from said antenna through air, wherein said self contained control module is releaseably mountable to a portion of said vehicle;

a receiver module having an antenna for receiving said radio frequency signals, said receiver module having a filter coupled to said antenna for selective reception of said radio frequency signals within a predetermined frequency range, wherein said receiver module extracts said control signals from said radio frequency signals for processing; and a control circuit coupled to said receiver module to process said control signals, said control circuit coupled to said vehicle cruise control associated with said vehicle to operate said vehicle cruise control based upon said control signals.

14. The remote control of claim 12, wherein, said control circuit verifies said control signals by comparing said received control signals with predetermined information to validate receipt of said control signals and prevent operation of said speed control system unless said at least one control transducer is actuated by a user.

15. The remote control of claim 14, wherein, said control circuit includes a microprocessor used to interpret said control signals, wherein said microprocessor verifies said control signals transmitted by said control module and rejects other signals which may be detected by said receiver module.

16. The remote control of claim 15, wherein, said microprocessor is programmed to control one of a plurality of different speed control systems.

17. The remote control of claim 14, wherein, at least one input signal supplied to said microprocessor instructs said microprocessor to control one of a plurality of different speed control systems allowing said control system to be retrofitted within a plurality of different vehicles.

* * * * *